United States Patent
Takeuchi et al.

(10) Patent No.: US 8,687,248 B2
(45) Date of Patent: Apr. 1, 2014

(54) IMAGE READING APPARATUS

(75) Inventors: Masaru Takeuchi, Handa (JP); Katsuro Miura, Kiyosu (JP); Takashi Fujiwara, Aichi-ken (JP); Takayuki Akimatsu, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 265 days.

(21) Appl. No.: 13/073,105

(22) Filed: Mar. 28, 2011

(65) Prior Publication Data

US 2011/0242624 A1    Oct. 6, 2011

(30) Foreign Application Priority Data

Mar. 30, 2010    (JP) .................. 2010-077123

(51) Int. Cl.
*H04N 1/04* (2006.01)
*G03G 15/00* (2006.01)

(52) U.S. Cl.
USPC ............... 358/498; 399/367; 399/125

(58) Field of Classification Search
USPC .............. 358/498, 408, 496; 399/367, 125; 355/407, 75
See application file for complete search history.

(56) References Cited

U.S. PATENT DOCUMENTS

| | | | |
|---|---|---|---|
| 5,923,438 A | 7/1999 | Fujiwara | |
| 6,178,274 B1 | 1/2001 | Youda et al. | |
| 6,347,213 B1 | 2/2002 | Yamanaka et al. | |
| 6,349,155 B1 | 2/2002 | Youda et al. | |
| 7,035,566 B2 | 4/2006 | Aiba | |
| 7,209,677 B2 | 4/2007 | Aiba | |
| 7,379,700 B2 * | 5/2008 | Iwata | 399/367 |
| 7,738,146 B2 | 6/2010 | Osakabe et al. | |
| 7,755,810 B2 | 7/2010 | Kuse | |
| 2002/0176115 A1 | 11/2002 | Yamamoto | |
| 2003/0038989 A1 | 2/2003 | Yokota et al. | |
| 2003/0048466 A1 | 3/2003 | Yamada et al. | |
| 2003/0081269 A1 | 5/2003 | Aoyama et al. | |
| 2004/0223796 A1 | 11/2004 | Iwata | |
| 2005/0046912 A1 | 3/2005 | Nobe et al. | |

(Continued)

FOREIGN PATENT DOCUMENTS

| | | | |
|---|---|---|---|
| JP | HEI06-037995 A | 2/1994 |
| JP | HEI07-291476 A | 11/1995 |

(Continued)

OTHER PUBLICATIONS

JP Office Action dtd Mar. 27, 2012, JP Appln. 2010-077123, English translation.

(Continued)

*Primary Examiner* — Charlotte M Baker
*Assistant Examiner* — Rury Grisham
(74) *Attorney, Agent, or Firm* — Banner & Witcoff, Ltd.

(57) ABSTRACT

An image reading apparatus configured to read images of both surfaces of a document is provided. The image reading apparatus may include a first image reading device configured to read an image of a first surface of a document, a second image reading device configured to read an image of a second surface of the document, and a document conveying mechanism configured to convey the document from the second image reading device to the first image reading device. The first image reading device has a first reading range, and the second image reading device has a second reading range, which is smaller than the first reading range.

12 Claims, 10 Drawing Sheets

(56) References Cited

U.S. PATENT DOCUMENTS

| | | | |
|---|---|---|---|
| 2007/0019249 A1 | 1/2007 | Osakabe et al. | |
| 2007/0047023 A1 | 3/2007 | Oguri et al. | |
| 2007/0268529 A1 | 11/2007 | Kuse | |
| 2008/0158621 A1* | 7/2008 | Hamada et al. | 358/498 |
| 2009/0049072 A1 | 2/2009 | Wakahara | |
| 2009/0122365 A1 | 5/2009 | Noda et al. | |
| 2010/0072690 A1 | 3/2010 | Hiura et al. | |
| 2010/0165368 A1 | 7/2010 | Matsuoka | |
| 2012/0170087 A1* | 7/2012 | Nose et al. | 358/498 |

FOREIGN PATENT DOCUMENTS

| | | |
|---|---|---|
| JP | HEI08-340418 A | 12/1996 |
| JP | HEI10-112771 A | 4/1998 |
| JP | 10-145548 | 5/1998 |
| JP | 2000-134417 A | 5/2000 |
| JP | 2000-188665 A | 7/2000 |
| JP | 2002-199168 | 7/2002 |
| JP | 2003-051918 A | 2/2003 |
| JP | 2003-140275 | 5/2003 |
| JP | 2004-348124 A | 12/2004 |
| JP | 2005-080128 | 3/2005 |
| JP | 2005-167839 A | 6/2005 |
| JP | 2006-333003 | 12/2006 |
| JP | 2007-036426 A | 2/2007 |
| JP | 2007-067810 | 3/2007 |
| JP | 2007-311863 A | 11/2007 |
| JP | 2008-156108 A | 7/2008 |
| JP | 2000-236415 A | 8/2008 |

OTHER PUBLICATIONS

Co-pending U.S. Appl. No. 13/073,018, filed Mar. 28, 2011.
Co-pending U.S. Appl. No. 13/073,065, filed Mar. 28, 2011.
JP Notice of Reasons for Rejection dated Feb. 7, 2012, corresponding Application No. 2010-077124; English Translation.
JP Decision to Grant a Patent dated Feb. 14, 2012, corresponding Application No. 2010-077125; English Translation.
Non Final Office Action issued in corresponding U.S. Appl. No. 13/073,065 mailed Mar. 29, 2013.
Non Final Office Action received in U.S. Appl. No. 13/073,018 mailed May 8, 2013.

* cited by examiner

IMAGE READING APPARATUS

CROSS REFERENCE TO RELATED APPLICATION

This application claims priority from Japanese Patent Application No. 2010-077123, filed on Mar. 30, 2010, the entire subject matter and contents of which is incorporated herein by reference.

TECHNICAL FIELD

Aspects of the invention relate to an image reading apparatus including a first image reading device and a second image reading device.

BACKGROUND

Some existing image reading apparatuses may be configured to read images of both surfaces of a document conveyed through a conveying path.

A known image reading apparatus may include a single image reading device configured to read images of both surfaces of a document conveyed through a conveying path.

Another known image reading apparatus may include a first image reading device configured to read an image formed on a first surface of a document conveyed through a conveying path and a second image reading device configured to read an image formed on a second surface formed on the document.

The image reading apparatus including the first image reading device and the second image reading device can quickly read images of both surfaces of a document.

SUMMARY

However, use of the first image reading device and the second image reading device may increase the manufacturing cost, the physical size, or the weight of the image reading apparatus.

Aspects of the invention may provide an image reading apparatus in which the need to increase the manufacturing cost, the physical size or the weight of the image reading apparatus may be reduced.

According to an aspect of the disclosure, an image reading apparatus includes a first image reading device configured to read an image of a first surface of a first document, a second image reading device configured to read an image of a second surface of the first document, and a document conveying mechanism configured to convey the first document from the second image reading device to the first image reading device. The first image reading device has a first reading range, and the second image reading device has a second reading range that is different from the first reading range.

BRIEF DESCRIPTION OF THE DRAWINGS

Illustrative aspects of the disclosure will be described in detail with reference to the following figures in which like elements are labeled with like numbers and in which.

DETAILED DESCRIPTION

A first illustrative embodiment of the invention will be described in detail with reference to the accompanying drawings.

The general structure of an illustrative image reading apparatus 1 as an example of an image reading apparatus according to illustrative aspects of the disclosure will be described with reference to FIGS. 1, 2, and 3.

For ease of discussion, in the following description, the top or upper side, the bottom or lower side, the left or left side, the right or right side, the front or front side, and the rear or rear side are used to define the various parts when the image reading apparatus 1 is disposed in an orientation in which it is intended to be used. In FIG. 1, the lower right side is referred to as the front or front side, the upper left side is referred to as the rear or the rear side, the up side is referred to as the top or upper side, the down side is referred to as the bottom or lower side, the lower left side is referred to as the left or left side, and the upper right side is referred to as the right or right side.

Figure 1:
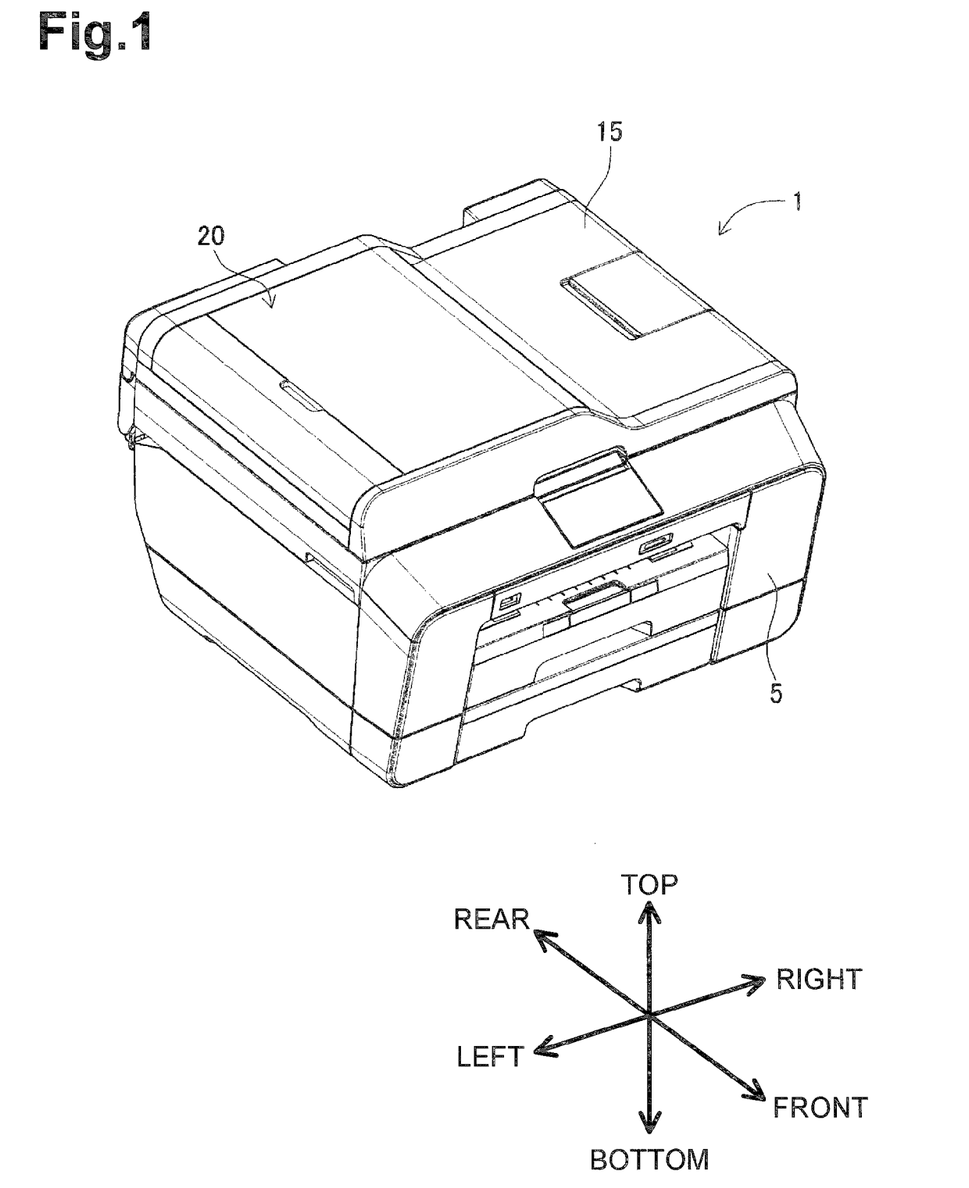
FIG. 1 is a perspective view of an image reading apparatus.
Figure 2:
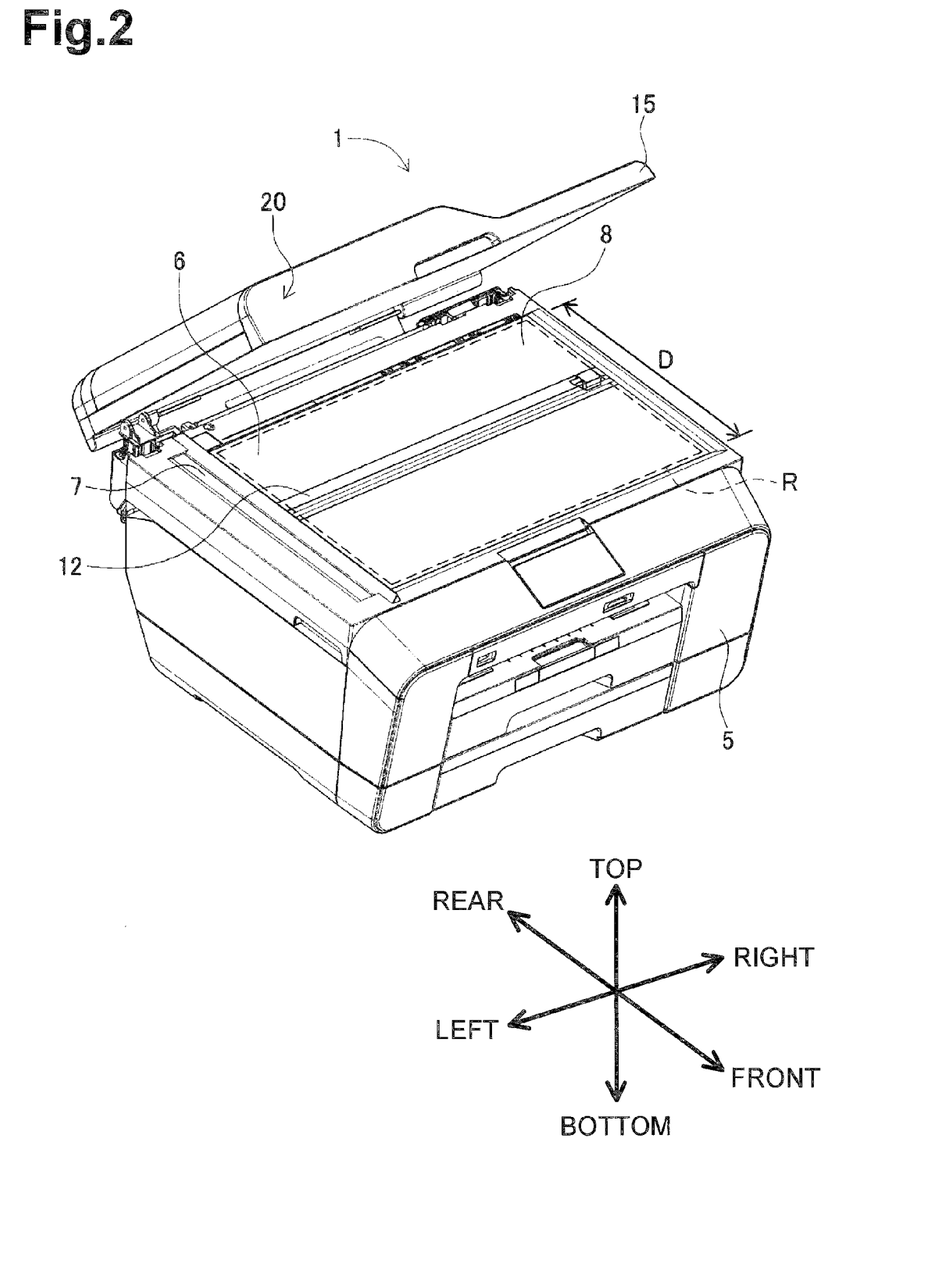
FIG. 2 is a perspective view of the image reading apparatus in which a cover unit is open.
Figure 3:
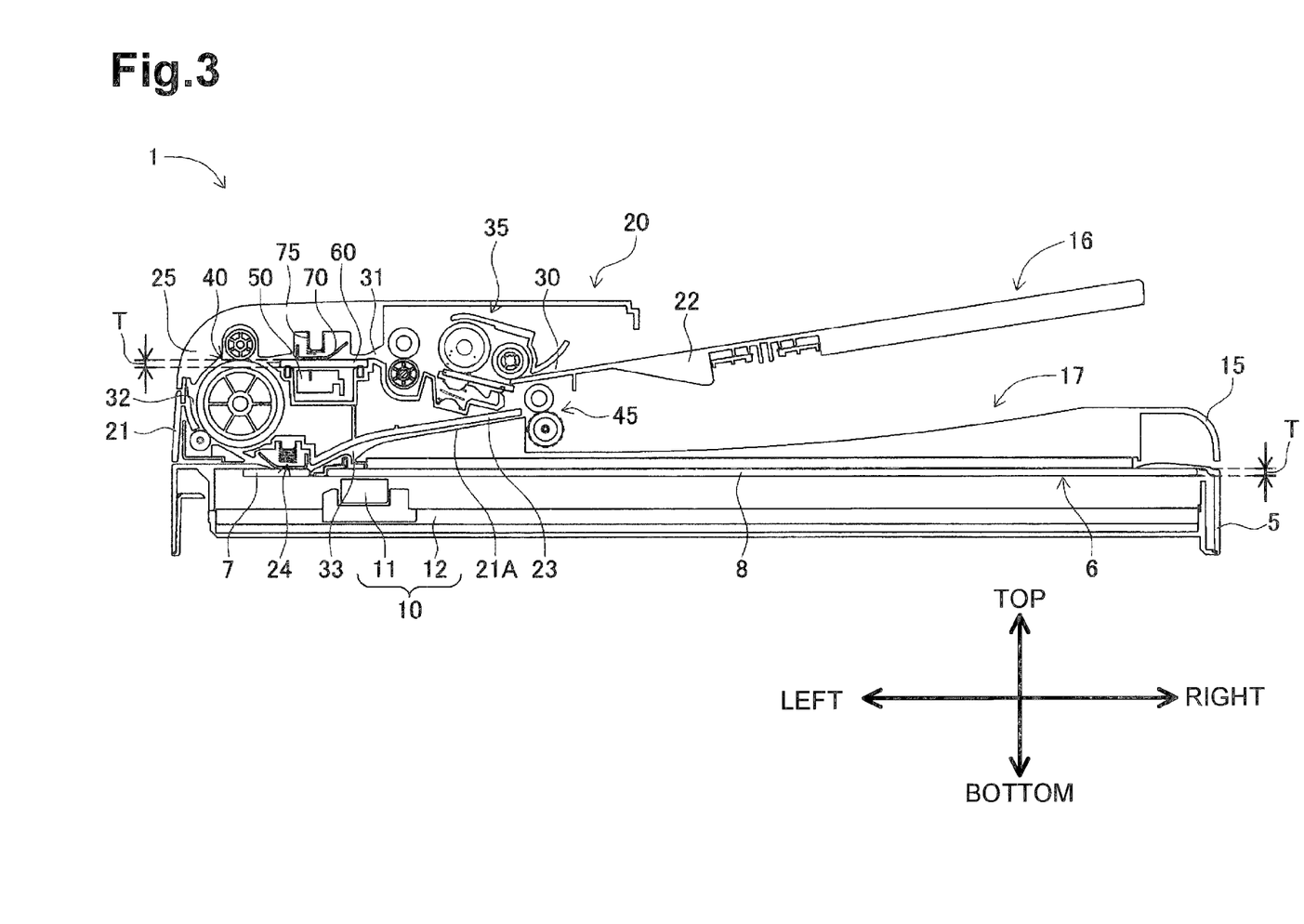
FIG. 3 is a cross sectional view illustrating a structure of the cover unit.

As shown in FIGS. 1, 2, and 3, the image reading apparatus 1 includes a main unit 5 including a first image reading device 10, and a cover unit 15 including an automatic document feeder (ADF) 20.

As shown in FIGS. 2 and 3, the main unit 5 includes a contact glass 6 on the top surface. The contact glass 6 includes a first glass 7 and a second glass 8. The first glass 7 is used when the first image reading device 10 remains stationary at a predetermined position and reads an image of a document conveyed by the ADF 20. When there are some documents to be read on the ADF 20, the documents are serially conveyed to pass over the first glass 7. As shown in FIG. 3, the first glass 7 has thickness T, and is shaped in a rectangle whose long side extends in the front and rear direction of the main unit 5 and is slightly greater than the short side of A3 size.

The second glass 8 is what is called a platen glass, and is shaped in a rectangle slightly greater than A3 size, in which the long side of the second glass 8 extends along the right and left direction of the main unit 5. The second glass 8 is used when a first image sensor 11 of the first image reading device 10 moves to read an image of a document placed on the second glass 8. As shown in FIG. 3, the second glass 8 also has the same thickness T as the first glass 7.

As shown in FIGS. 2 and 3, the main unit 5 includes the first image reading device 10 below the contact glass 6. The first image reading device 10 includes the first image sensor 11 and a slide shaft 12. The first image sensor 11 is a so-called contact image sensor, CIS, and configured to read an image of a document on the contact glass 6.

The first image sensor 11 has a reading range whose length corresponds to the short side of the A3 size in the main scanning direction (that is, the front-rear direction in the main unit 5). The length corresponding to the short side of the A3 size is hereinafter referred to as a first dimension D. The slide shaft 12 extends in the right-left direction in the main unit 5, and holds the first image sensor 11 such that the first image sensor 11 is slidable in the right-left direction. The first image sensor 11 can be slid along the slide shaft 12 by a motor and drive mechanism (e.g., a pulley and belt mechanism). The first image sensor 11 may be positioned at a stationary reading position under the first glass 7. In addition, the first image sensor 11 may be slidable in a range between a left position along the left edge of the second glass 8 and a right position away from the left position for a distance corresponding to the long side of A3 size. Thus, the first image reading device 10 has the maximum reading range R corresponding to A3 size, and can read an image of a document of a size smaller than or equal to A3 size.

As shown in FIGS. 1 and 2, the cover unit 15 is disposed pivotally on the rear end of the top surface of the main unit 5 between a closed state shown in FIG. 1 and an open state shown in FIG. 2. The cover unit 15 covers the top surface of the main unit 5 when in the closed state. Thus, the cover unit 15 is configured to fix a document set on the second glass 8, in position. As shown in FIG. 3, the cover unit 15 includes a document tray 16, an ejection tray 17, and the ADF 20. The document tray 16 is disposed on an upper right side of the cover unit 15 and configured to receive a stack of documents to be read. The ejection tray 17 is disposed on the right side of the cover unit 15 and below the document tray 16, and configured to receive documents ejected from the ADF 20. The document tray 16 and the ejection tray 17 are arranged vertically.

The ADF 20 is disposed on the left side of the cover unit 15 and configured to successively and singly at a time feed documents in the document tray 16 through a U-shaped conveying path 30 to the ejection tray 17. In the first embodiment, a direction from the document tray 16 along the U-shaped conveying path 30 to the ejection tray 17 is referred to as a document conveying direction. The ADF 20 includes a second image reading device 50 in a specified position along the U-shaped conveying path 30. The image reading apparatus 1 can read an image of a first surface (e.g. a back surface) of a document conveyed through the U-shaped conveying path 30 by the second image reading device 50.

Figure 4:
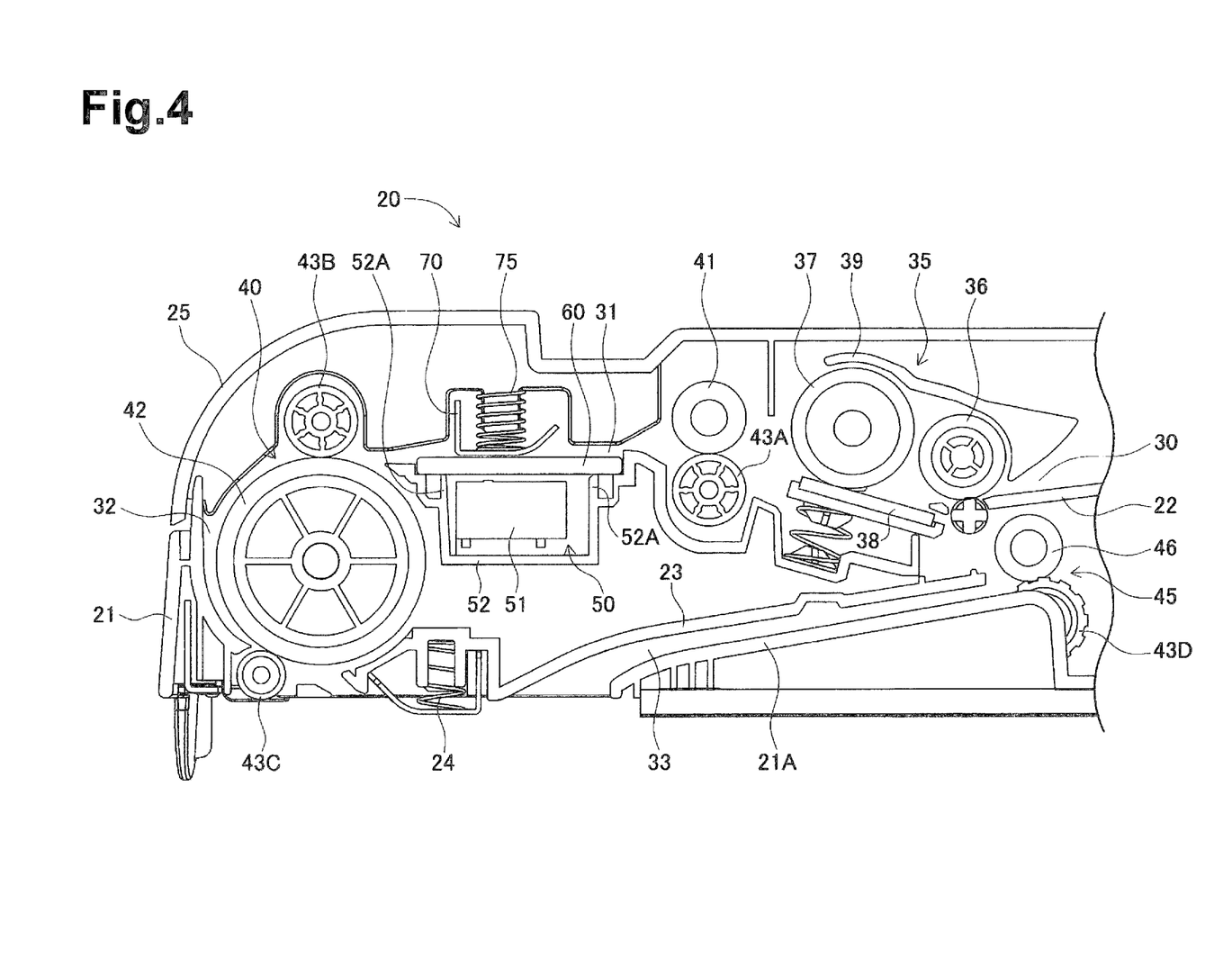
FIG. 4 is an enlarged cross sectional view illustrating a structure of an automatic document feeder.

As shown in FIGS. 3 and 4, the ADF 20 includes an opening in a specified position on the left side of the bottom surface of the ADF 20 (that is the bottom surface of the cover unit 15). The opening extends in the front-rear direction of the main unit 5 and faces the U-shaped conveying path 30. When the cover unit 15 is in the closed state, the opening is located above the first glass 7. Thus, a document to be conveyed through the U-shaped conveying path 30 is exposed at the opening in which a second surface (e.g. a front surface) of the document faces down. As a result, when the first image sensor 11 is located in the stationary reading position, the image reading apparatus 1 can read an image of the second surface of the document conveyed through the U-shaped conveying path 30 by the first image reading device 10.

The structure of the ADF 20 according to the first embodiment will be described with reference to FIG. 3.

As shown in FIG. 3, the ADF 20 includes the U-shaped conveying path 30, a supply unit 35, a conveying unit 40, an ejection unit 45, and a second image reading device 50. With this structure, a document is conveyed and an image of the document is read through the U-shaped conveying path 30.

The ADF 20 further includes a main frame 21, an upper guide 22, a lower guide 23, and an upper cover 25. The main frame 21 constitutes a casing of the ADF 20 and is made of a synthetic resin, e.g. acrylonitrile butadiene styrene (ABS) resin.

The upper guide 22 is formed by extending a downstream end of the document tray 16 in the document conveying direction and configured to guide a document in the document tray 16 toward the supply unit 35. The lower guide 23 extends from the opening to the ejection tray 17, and is configured to guide the document conveyed through the U-shaped conveying path 30 to the ejection unit 45 and ejection tray 17. That is, the upper guide 22 and the lower guide 23 are arranged vertically such that the upper guide is located above the lower guide 23.

The upper cover 25 constitutes the top surface of the ADF 20, and is pivotally supported on a rotation shaft positioned at the left end of the ADF 20 (that is, the left end of the cover unit 15). The upper cover 25 is configured to move between a closed state shown in FIGS. 3 and 4 and an open state shown in FIG. 5. When the upper cover 25 is in the closed state, the upper cover 25 covers the supply unit 35, the conveying unit 40, and the upper portion of the second image reading device 50. Thus, the upper portion of the U-shaped conveying path 30 is covered. When the upper cover 25 is in the open state, the upper cover 25 is separated from the supply unit 35, the conveying unit 40 and the second image reading device 50, and the upper portion of the U-shaped conveying path 30 is exposed.

The structure of the U-shaped conveying path 30 in the ADF 20 will be described.

As shown in FIGS. 3 and 4, the U-shaped conveying path 30 is formed in a U-shape with respect to the right and left direction of the ADF 20 so as to connect the document tray 16 and the ejection tray 17. In other words, the U-shaped conveying path 30 is not configured to convey a document in the front-rear direction of the ADF 20. The U-shaped conveying path 30 is defined by a first conveying path 31, a curved conveying path 32, and a second conveying path 33.

Figure 5:
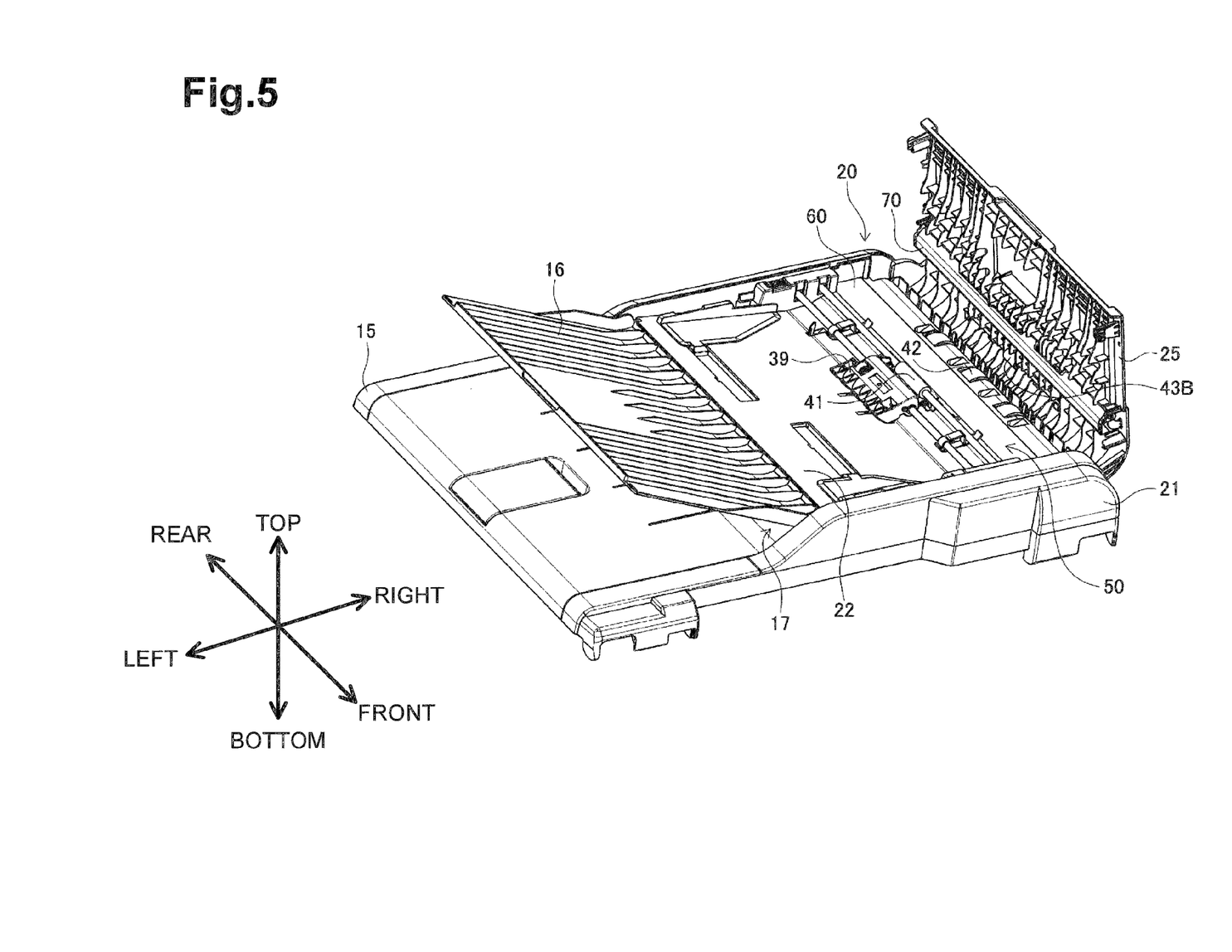
FIG. 5 is a perspective view of the cover unit in which an upper cover is in an open state.

The first conveying path 31 extends from the downstream end of the document tray 16 in the document conveying direction to the left end of the ADF 20 (above a main roller 42 shown in FIG. 4). When the upper cover 25 is in the closed state, the upper cover 25 covers the first conveying path 31 from above. As shown in FIG. 5, the inside surface of the upper cover 25 is provided with a plurality of ribs, which protrude toward the first conveying path 31 when the upper cover 25 is in the closed state. These ribs are configured to guide an upper surface of a document to be conveyed in the first conveying path 31. In other words, the inside surface of the upper cover 25 defines an upper surface of the first conveying path 31, together with a pickup roller 36 and a separation roller 36 of the supply unit 35, a conveying roller 41 of the conveying unit 40, and a document pressing member 70, which will be described later. The lower surface of the first conveying path 31 is defined by upper surfaces of the upper guide 22, a separation pad 38, and a glass member 60 that is positioned in the upper portion of the second image reading device 50. These components defining the upper and lower surfaces of the first conveying path 31 comprise a first document conveying mechanism.

The curved conveying path 32 is curved downward from a downstream end of the first conveying path 31 in the document conveying direction to have a semicircular arc shape. As shown in FIG. 4, the curved conveying path 32 conforms to an outer surface of the main roller 42 and is connected to the second conveying path 33 on the left side of the ADF 20 (under the main roller 42). The curved conveying path 32 is defined by the outer surface of the main roller 42 and the main frame 21 and the inside surfaces of the upper cover 25. These components defining the curved conveying path 32 comprise a curved document conveying mechanism.

The second conveying path 33 generally straightly extends from the lower end of the curved conveying path 32 to the ejection unit 45 and the ejection tray 17. The second conveying path 33 is defined mainly by the lower guide 23 and a wall surface 21A of the main unit 21 of the cover unit 15, which is disposed facing and away from the lower guide 23. These components defining the second conveying path 33 comprise a second document conveying mechanism. The second conveying path 33 is located below the first conveying path 31. The second conveying path 33 includes a part facing the first glass 7 in the proximity of the main roller 42. When the document passes through the part facing the first glass 7, the document passes over the opening formed in the bottom surface of the cover unit 15. Thus, a document conveyed through the U-shaped conveying path 30 is conveyed via the opening to the ejection tray 17. A known document pressing portion 24 is disposed at a position facing the opening in the second conveying path 33. The document pressing portion 24 can bring the document closer to the first glass 7 when the document passes above the opening. Thus, the image reading apparatus 1 can improve the image reading accuracy by the first image reading device 10 at the first glass 7.

The supply unit 35 of the ADF 20 will be described with reference to FIG. 4.

The supply unit 35 is disposed in the proximity of an end of the first conveying path 31 closer to the document tray 16. The supply unit 35 is configured to separate documents placed on the document tray 16 and supply a document at one time toward the conveying unit 40. As shown in FIG. 4, the supply unit 35 includes a pickup roller 36, a separation roller 37, a separation pad 38, and an arm 39.

The pickup roller 36 is rotatably supported in a position along the upper surface of the first conveying path 31 on an upstream side in the supply unit 35 in the document conveying direction. The pickup roller 36 is driven and rotated in a predetermine direction (e.g. clockwise in FIG. 4) by drive of a motor (not shown) via a known transmission mechanism. The pickup roller 36 is configured to convey a document placed in the document tray 16 to the separation roller 37 (toward the downstream side in the document conveying direction).

The separation roller 37 is rotatably supported to the main frame 21 on the downstream side from the pickup roller 36 in the document conveying direction. The separation roller 37 is driven and rotated in a predetermined direction (e.g. clockwise in FIG. 4) by drive of a motor (not shown). The separation pad 38 is disposed at a position facing the separation roller 37 on the lower surface of the first conveying path 31. The separation pad 38 is urged toward the separation roller 37. Thus, the separation roller 37 and the separation pad 38 operate together such as to separate a document directly contacting the separation roller 37 and convey the document only to the conveying unit 40 (to the downstream side in the document conveying direction).

The arm 39 is supported via bearings to the rotation shaft of the separation roller 37. The arm 39 extends from the shaft of the separation roller 37 toward an upstream side in the document conveying direction, and rotatably supports both ends of the pickup roller 36. The arm 39 is configured to rock on the rotation shaft of the separation roller 37 by drive from the motor.

The conveying unit 40 of the ADF 20 will be described with reference to FIG. 4.

The conveying unit 40 is disposed on a downstream side of the supply unit 35 in the document conveying direction, and configured to convey the document supplied by the supply unit 35 along the U-shaped conveying path 30 toward the ejection unit 45. The conveying unit 40 includes a conveying roller 41, the main roller 42, and pinch rollers 43A, 43B, and 43C.

The conveying roller 41 is disposed on a downstream side of the supply unit 35 in the document conveying direction and in a position conforming to the upper surface of the first conveying path 31. The conveying roller 41 is driven by drive of a motor (not shown) and rotated. The pinch roller 43A is disposed at a position facing the conveying roller 41 in the first conveying path 31. Thus, the document supplied by the supply unit 35 is pinched by the conveying roller 41 and the pinch roller 43A and conveyed in the first conveying path 31 toward the downstream side in the document conveying direction along with the rotation of the conveying roller 41.

The main roller 42 is rotatably supported to the main frame 21 at the left end of the ADF 20, and driven by drive of a motor (not shown) and rotated. As described above, the curved conveying path 32 is formed conforming to the outer surface of the main roller 42. In other words, the outer surface of the main roller 42 constitutes a part of the curved conveying path 32.

The pinch roller 43B is disposed in the boundary between the first conveying path 31 and the curved conveying path 32 in an upper position of the main roller 42 and rotatably supported facing the main roller 42. Thus, the main roller 42 pinches the document conveyed in the first conveying path 31 along with the pinch roller 43B and rotates due to the drive of the motor such as to convey the document to the curved conveying path 32.

The pinch roller 43C is disposed in the boundary between the curved conveying path 32 and the second conveying path 33 in a lower position of the main roller 42 and rotatably supported facing the main roller 42. Thus, the main roller 42 pinches the document conveyed in the curved conveying path 32 along with the pinch roller 43C and rotates due to the drive of the motor so as to convey the document to the second conveying path 33.

The ejection unit 45 of the ADF 20 will be described with reference to FIG. 4.

The ejection unit 45 is configured to eject the document conveyed through the U-shaped conveying path 30 to the ejection tray 17. The ejection unit 45 includes an ejection roller 46 and the pinch roller 43D. The ejection roller 46 is rotatably supported at a position along the upper surface of the second conveying path 33 in the vicinity of the downstream end of the second conveying path 33 in the document conveying direction (that is, in the vicinity of the termination of the U-shaped conveying path 30). The ejection roller 46 is configured to rotate due to the drive of the motor. The pinch roller 43D is rotatably supported facing the ejection roller 46 from below via the second conveying path 33. Thus, the ejection roller 46 pinches the document conveyed through the second conveying path 33 along with the pinch roller 43D and rotates due to the drive of the motor so as to eject the document to the ejection tray 17.

The second image reading device 50 disposed in the ADF 20 will be described.

The second image reading device 50 is configured to read an image of a document conveyed in the first conveying path 31. As shown in FIG. 4, the second image reading device 50 is disposed downstream from the conveying roller 41 and upstream from the main roller 42 in the document conveying direction, and facing the lower surface of the first conveying path 31. The second image reading device 50 includes a second image sensor 51, a sensor holder 52, and the glass member 60.

The second image sensor 51 is what is called a contact image sensor (CIS), and is disposed with its reading surface for reading an image, facing up (toward the first conveying path 31). The second image sensor 51 has a reading range whose length corresponds to the short side of A4 size in the main scanning direction (that is, the front-rear direction in the main unit 5). The length corresponding to the short side of A4 size is hereinafter referred to as a second dimension L. Thus, the second image sensor 51 is lighter than the first image sensor 11. A document conveyed in the first conveying path 31 passes over the reading surface of the second image sensor 51. Thus, the image reading apparatus 1 is configured to read an image formed on a first surface (e.g. back surface) of a document conveyed in the first conveying path 31 by the second image reading device 50.

The sensor holder 52 has a box shape, is open toward the first conveying path 31, and configured to hold the second image sensor 51 inside. As shown in FIGS. 3 and 4, the sensor holder 52 holds the second image sensor 51 in a predetermined position inside the sensor holder 52 (a position facing the first conveying path 31 and close to the glass member 60).

The glass member 60 is made of a reinforced glass and performs the same function as the first glass 7 and the second glass 8 for the first image sensor 11. The glass member 60 is disposed above the second image sensor 51 and along the lower surface of the first conveying path 31, and constitutes a part of the first conveying path 31. The glass member 60 is configured to cover the second image sensor 51 and guide a document conveyed in the first conveying path 31.

The ADF 20 includes a document pressing member 70 and an urging member 75. The document pressing member 70 and the urging member 75 are disposed facing the second image reading device 50 via the first conveying path 31. Specifically, as shown in FIG. 5, the document pressing member 70 and the urging member 75 are disposed in position on an inner wall surface of the upper cover 25. When the upper cover 25 is in the closed state, the document pressing member 70 and the urging member 75 face the second image reading device 50 via the first conveying path 31. The urging member 75 is configured to urge the document holding member 70 toward the first conveying path 31 and the second image reading device 50 by its elastic force. Thus, the document pressing member 70 is configured to press the document conveyed in the first conveying path 31 toward the second image reading device 50. With this arrangement, the image reading apparatus 1 can improve the image reading accuracy of the second image reading device 50.

The following will describe automatic document reading operation for reading images on both surfaces (a first surface and a second surface) of a document in the image reading apparatus 1 according to the first embodiment. In the following description, it is assumed that documents to be read are set in the document tray 16 with their first surfaces facing up and the first image sensor 11 is located in the stationary reading position under the first glass 7.

The uppermost document set in the document tray 16 contacts the pickup roller 36 of the supply unit 35. Thus, the document is supplied from the document tray 16 by the rotation of the pickup roller 36 due to the drive of the motor, and is conveyed via the separation roller 37 along the first conveying path 31 to the conveying unit 40. The document conveyed to the conveying unit 40 is conveyed by the conveying roller 41 and the pinch roller 43A, and passes over the second image reading device 50. At this time, as the second surface of the document faces the second image reading device 50, the second image reading device 50 reads an image formed on the second surface of the document.

After passing over the second image reading device 50, the document goes in the curved conveying path 32, and is conveyed to the ejection unit 45 by the rotation of the main roller 42. After passing through the curved conveying path 32, the first surface of the document faces down. When going in the second conveying path 33 after the curved conveying path 32, the document reaches the document pressing portion 24 and the first glass 7. As described above, the opening is formed on the bottom surface of the cover unit 15 and in the vicinity of the document pressing portion 24. The document is exposed from the opening. The first glass 7 is located in the position facing the opening, and the first image sensor 11 is located below the first glass 7. Thus, the first surface of the document faces the first image reading device 10. When the document passes in an area of the second conveying path 33, which is formed by the document pressing portion 24 and the first glass 7, the first image reading device 10 reads an image of the first surface of the document.

After the image is read by the first image reading device 10, the document is conveyed along the second conveying path 33 to the ejection unit 45. When reaching the ejection unit 45, the document is conveyed to the ejection tray 17 by the rotation of the ejection roller 46.

The second image reading device 50 and the glass member 60 according to the first embodiment will be described.

Figure 6:
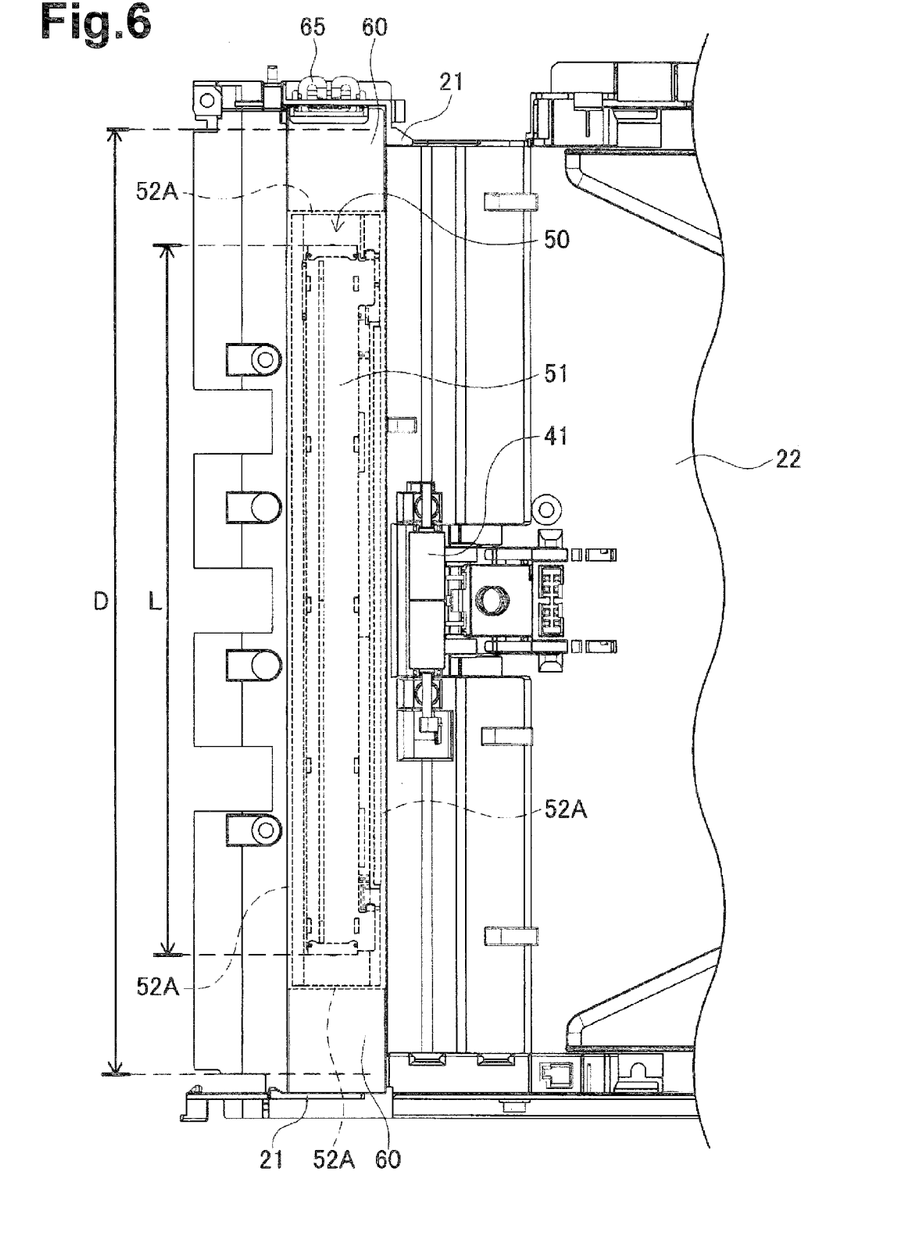
FIG. 6 is a top view of a second image reading device and neighboring parts according to a first illustrative embodiment.

As described above, the glass member 60 constitutes the top surface of the second image reading device 50 and is disposed at the position facing the second image sensor 51 along the first conveying path 31. As shown in FIG. 6, the glass member 60 is shaped in a rectangle whose long side extends in the front-rear direction (that is, in the main scanning direction of the second image reading device 50). The long side of the glass member 60 is greater than the first dimension D and the second dimension L. As shown in FIG. 3, the glass member 60 also has the same thickness T as the contact glass 6. Thus, in the image reading apparatus 1, no difference occurs in the reading accuracy between the first image reading device 10 and the second image reading device 50.

Figure 7A:
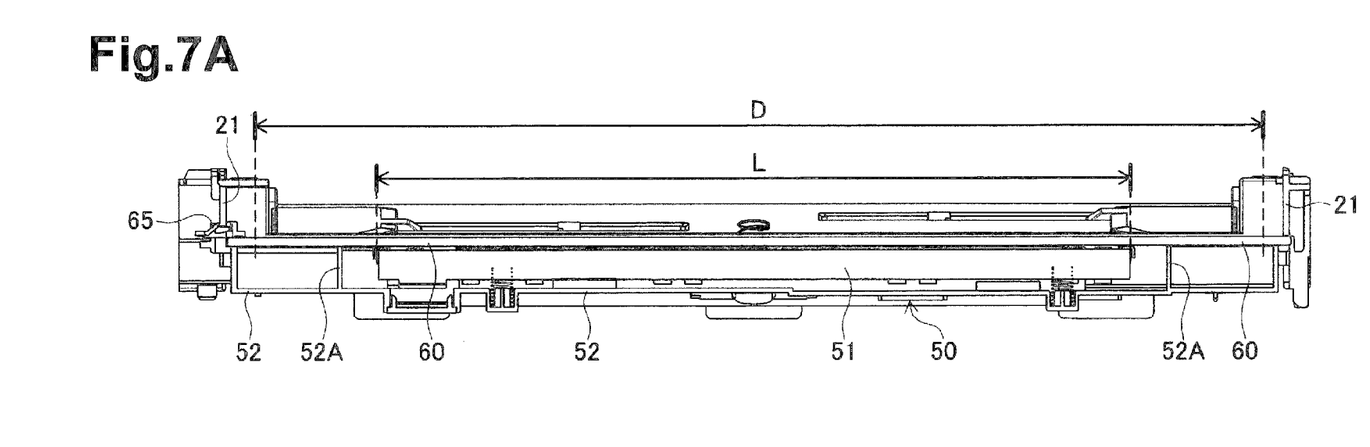
FIGS. 7A and 7B are cross sectional views of the second image reading device according to the first illustrative embodiment.
Figure 7B:
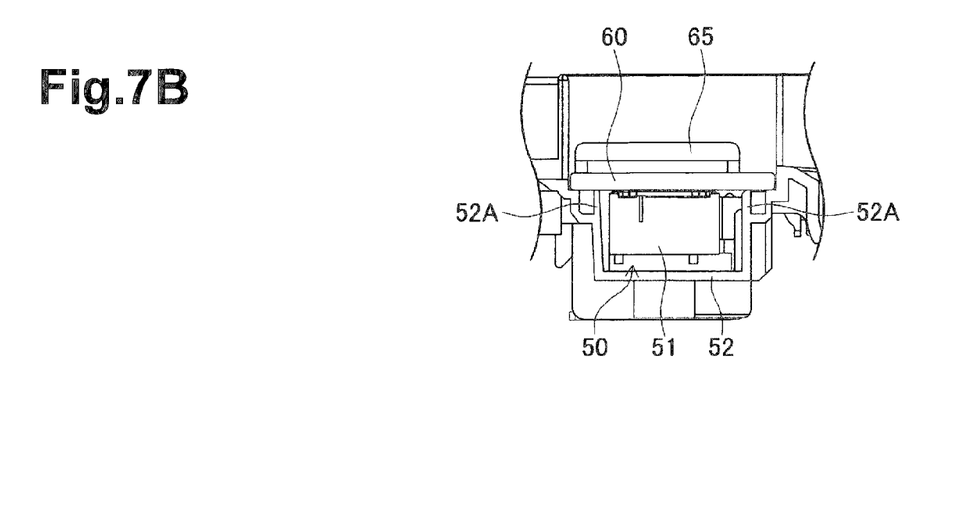

The glass member 60 is attached to the main frame 21 by inserting one end of the glass member 60 in its longitudinal direction into a hole formed in the inner wall surface of the main frame 21 on the front side of the ADF 20 and fixing the other end to the inner wall surface of the main frame 21 with a fixing portion 65. As shown in FIGS. 6 and 7, the fixing portion 65 holds the other end of the glass member 60 and engages with an engaging portion formed in the inner wall surface of the main frame 21. Thus, the glass member 60 can be removed from a predetermined position above the second image reading device 50 by disengaging the fixing portion 65. When the glass member 60 is attached in the predetermined position in the upper portion of the second image reading device 50, the fixing portion 65 is disposed at the other end of the glass member 60 outside the first dimension D.

Without the use of the second image reading device 50, the image reading apparatus 1 can read an image of a document conveyed by the ADF 20, by the first image reading device 10. The U-shaped conveying path 30 has a width corresponding to the first dimension D (equivalent to the short side of the A3 size) in the front-rear direction (that is, the main scanning direction of the first image reading device 10 and the second image reading device 50).

As described above, in the first embodiment, the long side of the glass member 60 extends in the main scanning direction and is greater than the first dimension D. Thus, as shown in FIG. 6, the short sides of the glass member 60 and any corner thereof are not located in the first conveying path 31. With this arrangement, the image reading apparatus 1 can minimize irregularities of the surface around the glass member 60 and prevent the document conveyed in the first conveying path 31 from getting damaged due to the irregularity.

As the fixing portion 65 holds the end of the glass member 60, the fixing portion 65 is also not located in the first conveying path 31. Thus, the image reading apparatus 1 does not get the document damaged by contact with the fixing portion 65.

The image reading apparatus 1 includes the second image sensor 51 and the sensor holder 52 under the glass member 60. The sensor holder 52 is box-shaped and open toward the first conveying path 31, and holds the second image sensor 51 inside. As shown in FIGS. 6, 7A and 7B, the sensor holder 52 includes ribs 52A extending upward from all sidewalls of the sensor holder 52 (four sidewalls enclosing the sensor image sensor 51), and contacting the undersurface of the glass member 60 as shown in FIGS. 7A and 7B. The second image sensor 51 is held in a position adjacent to the glass member 60 in a space defined by the ribs 52A of the sensor holder 52 and the glass member 60. Thus, dust produced in conveying of the document does not enter into the space defined by the ribs 52A of the sensor holder 52 and the glass member 60. The image reading apparatus 1 can reduce the potential for problems due to dust, such as the failure of the second image sensor 51 and the deterioration of the reading accuracy of the second image sensor 51.

As described above, the glass member 60 is detachably attached to the main frame 21 via the fixing portion 65 in the image reading apparatus 1. In the image reading apparatus 1, the glass member 60 and the fixing portion 65 can be replaced with a covering member 63 shown in FIG. 8.

Figure 8:
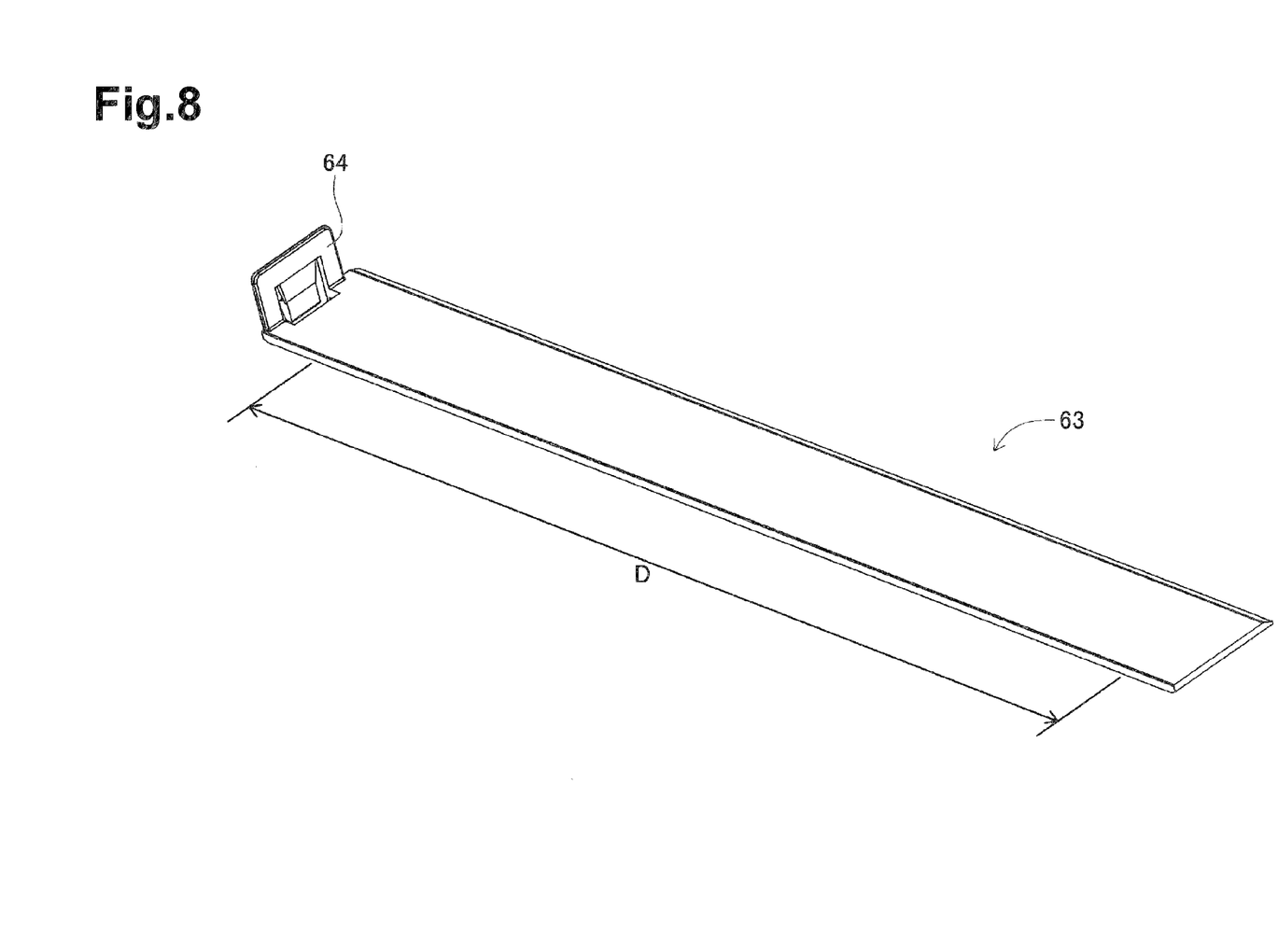
FIG. 8 is a perspective view of a covering member.

As shown in FIG. 8, the covering member 63 is formed of a rectangular plate identical in shape with the glass member 60, and has a fixing portion 64 at one end. Thus, the long side of the rectangular plate of the covering member 63 is also greater than the first dimension D and the second dimension L. The rectangular plate of the covering member 63 has the same thickness as the thickness T. The covering member 63 and the fixing portion 64 are made of a synthetic resin, e.g. acrylonitrile butadiene styrene (ABS) resin.

The covering member 63 is attached to the main frame 21 by inserting one end of the rectangular plate into the hole formed in the inner wall surface of the main frame 21 located on the front side of the ADF 20 and then engaging the fixing portion 64, which is formed on the other side, with an engaging portion formed in the inner wall surface of the main frame 21. Thus, the covering member 63 can be removed from a predetermined position in the main frame 21 (that is, the same position where the glass member 60 is disposed) by disengaging the fixing portion 64.

As described above, the long side of the rectangular plate of the covering member 63 is greater than the first dimension D. When the covering member 63 is attached to the main frame 21, the short sides of the covering member 63 and any corner thereof are not located in the first conveying path 31. Thus, the image reading apparatus 1 can minimize the irregularities of the surface in the first conveying path 31 and prevent the document conveyed in the first conveying path 31 from getting damaged due to the irregularity. In addition, the fixing portion 64 is disposed outside the first dimension D. Thus, the image reading apparatus 1 does not get the document damaged by contact with the fixing portion 64 even when the covering member 63 is attached.

The image reading apparatus 1 can be applicable as a model which does not have the second image sensor 51, uses the covering member 63 instead of the glass member 60 and the fixing portion 65, and performs image reading only by the first image reading device 10. In this case, the image reading apparatus 1 can use parts common to models (e.g. the main frame 21), which provides improved production efficiency of the image reading apparatus 1. In addition, as the fixing portion 64 is integrally formed with the covering member 63, the covering member 63 can be easily attached.

The image reading apparatus 1 according to the first embodiment includes the main unit 5 having the first image reading device 10, and the cover unit 15 rotatably supported at the rear end of the main unit 5. When in the closed state, the cover unit 15 covers the second glass 8 provided on the top surface of the main unit 5 and fixes a document set in the second glass 8 in position. The first image reading device 10 has the maximum reading range R. The maximum reading range corresponds to the size of the second glass 8, and has the first dimension D in the main scanning direction. The first image reading device 10 is slidable along the slide shaft 12 to read an image of the document set in the second glass 8. Thus, the image reading apparatus 1 is configured to read an image of a document set in the second glass 8 (or set within the maximum range R) by the first image reading device 10.

The cover unit 15 includes the document tray 16, the ejection tray 17, the U-shaped conveying path 30, and the second image reading device 50. A document set in the document tray 16 is conveyed through the U-shaped conveying path 30 while an image of the document is read by the second image reading device 50. The second image reading device 50 has the reading range having the second dimension L (FIG. 6) in the main scanning direction. The second dimension L is smaller than the first dimension D extending in the main scanning direction in the maximum reading range R. The second image reading device 50 is smaller and lighter than the first image reading device 10. Thus, in the image reading apparatus 1, the weight of the cover unit 15 comes down as the cover unit 15 is provided with the second image reading device 50, which is smaller and lighter than the first image reading device 10. The image reading apparatus 1 can reduce the burden on the user who handles with the cover unit 15 to set a document on the second glass 8.

In the image reading apparatus 1, the glass member 60 is located in the upper portion of the second image reading device 50 using the fixing portion 65. The glass member 60 is made of a reinforced glass, rectangular in form with the long side, which extends in the main scanning direction of the second image sensor 51 and is greater than the first dimension D. The glass member 60 is disposed along the inner wall surface of the first conveying path 31. Thus, the short sides of the glass member 60 and any corner thereof are not located in the first conveying path 31. The image reading apparatus 1 can minimize the irregularities of the surface in the first conveying path 31, contribute to smooth document conveying, and reduce the potential of problems such as paper jam and ripping due to the irregularities. In other words, as the second image reading device 50 has the second dimension L in the main scanning direction, which is smaller than the first dimension D, the size of the document to be read by the second image reading device 50 is assumed to be the size corresponding to the second dimension L. Thus, the size of the document to be conveyed over the glass member 60 which constitutes the conveying path is usually the size corresponding to the second dimension L. When the dimension of the glass member 60 in the main scanning direction is greater than the first dimension D, the irregularities of the surface in the first conveying path 31 caused when the glass member 60 is disposed can be eliminated, and thus the influence of the irregularities on a document to be conveyed in the first conveying path 31 whose size corresponds to the second dimension L can be reduced.

The fixing portion 65 is configured to detachably fix one end of the glass member 60 to the main frame 21. Thus, the fixing portion 65 is also not located in the first conveying path 31. As a result, when the document is conveyed in the first conveying path 31, the document does not contact the fixing portion 65. With this arrangement, the image reading apparatus 1 can reduce the potential of problems such as paper jam and ripping caused when the document contacts the fixing portion 65. In other words, because the fixing portion 65 fixes the glass member 60 at a position outside the first dimension D, even when a document whose size corresponds to the first dimension D is conveyed in the first conveying path 31, the document does not contact the fixing portion 65.

The glass member 60 has the same thickness T as the contact glass 6. Thus, the reading quality is not different between the second image reading device 50 and the first image reading device 10. Thus, the image reading apparatus 1 can obtain uniform reading quality between the first image reading device 10 and the second image reading device 50. For example, when a front surface and a back surface of a document are read by the first and second image reading devices 10 and 50, respectively, the image reading apparatus 1 can uniform reading quality between the first and second image reading devices 10 and 50 and achieve favorable double-sided reading.

In the second image reading device 50, the second image sensor 51 is held in position in the space defined by the ribs 52A of the sensor holder 52 and the glass member 60A. The ribs 52A extend upward from all sidewalls of the sensor holder 52 (four sidewalls enclosing the sensor image sensor 51 until the ribs 52A contact the undersurface of the glass member 60A. Thus, dust produced in conveying of the document does not reach the second image sensor 51. As a result, the image reading apparatus 1 can reduce the potential for the failure of the second image sensor 51 due to dust.

In the image reading apparatus 1, the glass member 60 and the fixing portion 65 can be replaced with the covering member 63 having the fixing portion 64. The image reading apparatus 1 can be applicable as an image reading apparatus having the first image reading device 10 only by removing the second image sensor 51 and replacing the glass member 60 and the fixing portion 65 with the covering member 63. In this image reading apparatus, the first image reading device 10 is configured to read an image on one surface of a document conveyed through the U-shaped conveying path 30, and to read an image of a document set on the second glass 8. Even with the covering member 63, the image reading apparatus 1 can minimize the irregularities of the surface in the first conveying path 31. In addition, as the fixing portion 64 is not located in the first conveying path 31, the image reading apparatus 1 can reduce the potential of problems such as ripping of a document due to the irregularities and contact with the fixing portion 64.

A second embodiment of the invention will be described.

It is noted that the image reading apparatus 1 according to the second embodiment is identical in basic structure to that of the first embodiment, except for the structure of the glass member 60.

In the first embodiment, the glass member 60 wholly made of reinforced glass is disposed facing the second image reading device 50 and along the first conveying path 31. In the second embodiment, however, a glass member 60A having a different structure is disposed at a position where the glass member 60 of the first embodiment is disposed. Thus, the following will describe the glass member 60A according to the second embodiment with reference to FIGS. 9, 10A, and 10B, where parts substantially equivalent to those described above are denoted by the same reference numerals and descriptions thereof will be omitted for the sake of brevity.

Figure 9:
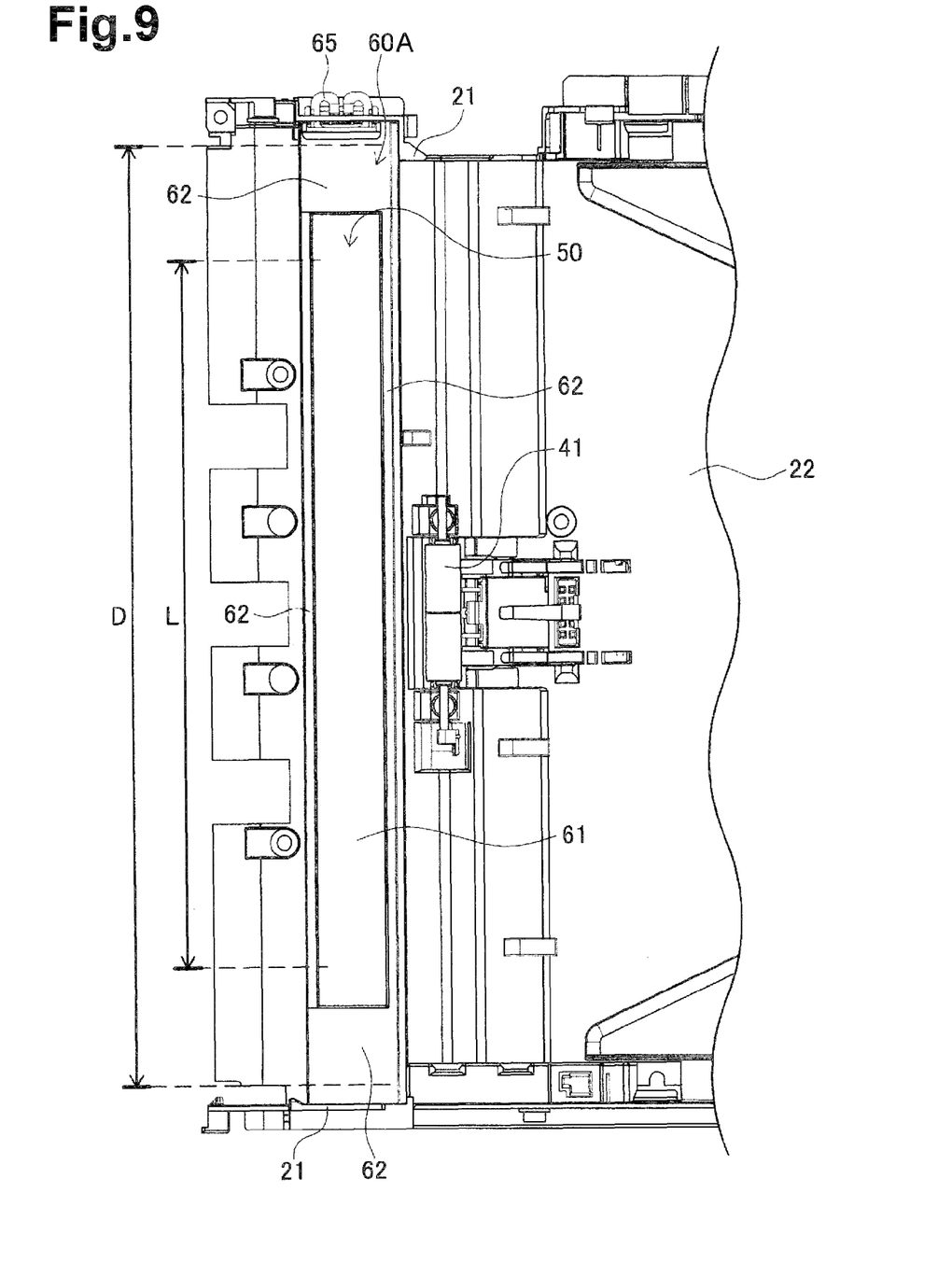
FIG. 9 is a top view of the second image reading device and neighboring parts according to a second illustrative embodiment.

As shown in FIG. 9, the glass member 60A is identical in shape with the glass member 60 of the first embodiment but different in that the glass member 60A includes a glass portion 61 and a glass holding frame 62. Thus, the glass member 60A is rectangularly shaped with its long side being greater than the first dimension D, as is the case with the first embodiment. The glass member 60A is attached to the main frame 21 by inserting one end in its longitudinal direction into the hole formed in the inner wall surface of the main frame 21 on the front side of the ADF 20 and fixing the other end to the inner wall surface of the main frame 21 with the fixing portion 65 on the rear side of the ADF 20. Thus, even in the second embodiment, the fixing portion 65 holds the other end of the glass member 60A and engages with the engaging portion formed in the inner wall surface of the main frame 21. When the glass member 60A is attached in the predetermined position in the upper portion of the second image reading device 50, the fixing portion 65 is disposed at the other end of the glass member 60A outside the first dimension D.

Figure 10A:
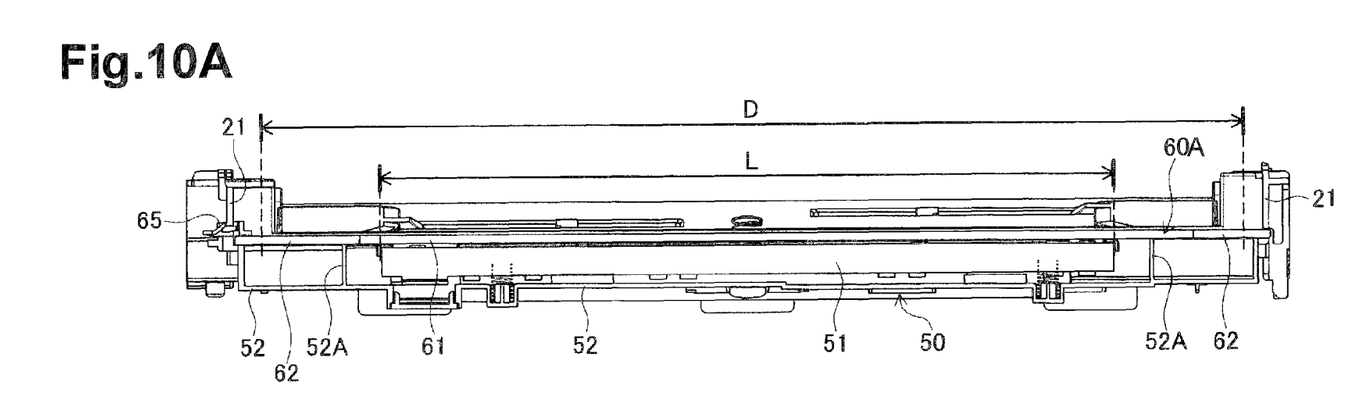
FIGS. 10A and 10B are cross sectional views of the second image reading device according to the second illustrative embodiment.
Figure 10B:
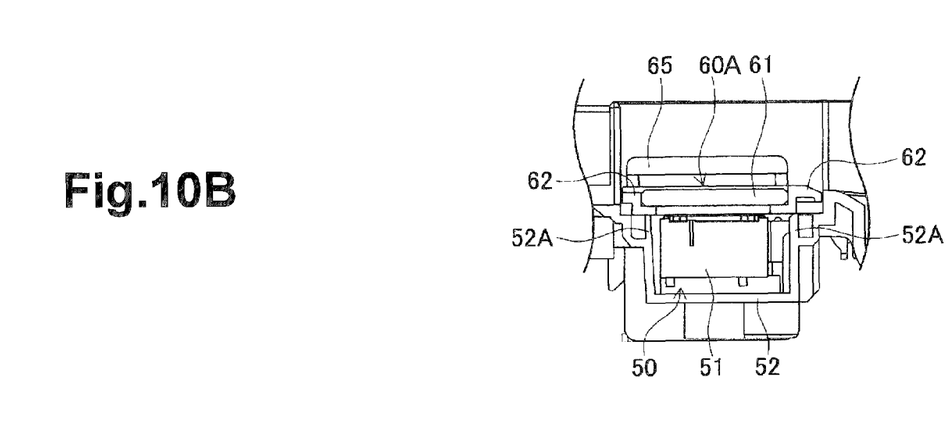

As shown in FIG. 9, in the second embodiment, the glass portion 61 is made of a reinforced glass having the thickness T, and is located in a central portion of the glass holding frame 62. As shown in FIGS. 10A and 10B, the glass portion 61 is shaped in a rectangle whose long side extends in the main scanning direction of the second image sensor 51 and is greater than the second dimension L, and the glass portion 61 is disposed facing the second image sensor 51. Thus, even in the image reading apparatus 1 of the second embodiment, the second image reading device 50 is configured to read an image of a document conveyed in the first conveying path 31. The glass portion 61 is disposed along the inner wall surface of the first conveying path 31 and constitutes a part of the first conveying path 31.

The glass holding frame 62 is made of a synthetic resin and fixedly holds the glass portion 61 in its central portion. As described above, the glass holding frame 62 has the long side greater than the first dimension D and is disposed in the position along the inner wall surface of the first conveying path 31 together with the glass portion 61. In the second embodiment also, the surface of the glass member 60A (that is, the surface of the glass portion 61 and the surface of the glass holding frame 62) constitutes a part of the first conveying path 31, as shown in FIGS. 10A and 10B. The glass portion 61 and the glass holding frame 62 are configured to cover the second image sensor 51 and guide a document conveyed in the first conveying path 31.

As the glass member 60A has the long side greater than the first dimension D, the short sides of the glass member 60A are not located in the first conveying path 31. Thus, the image reading apparatus 1 according to the second embodiment can minimize the irregularities of the surface in the first conveying path 31 and prevent a document to be conveyed in the first conveying path 31 from getting damaged due to the irregularities.

The glass member 60A is detachably attached in position in the upper portion of the second image reading device 50 by using the fixing portion 65 identical with that of the first embodiment. Thus, even in the second embodiment, the fixing portion 65 is not located in the first conveying path 31.

Accordingly, the image reading apparatus 1 does not get the document damaged by contact with the fixing portion 65.

In the second embodiment, the glass portion 61 facing the second image sensor 51 has the same thickness T as the contact glass 6. Thus, even in the image reading apparatus 1 according to the second embodiment, no difference occurs in the reading accuracy between the first image reading device 10 and the second image reading device 50.

As shown in FIGS. 10A and 10B, the ribs 52A extend upward from all sidewalls of the sensor holder 52 until they contact the undersurface of the glass member 60A. Thus, the second image sensor 51 is held in position in the space defined by the ribs 52A of the sensor holder 52 and the glass member 60A. As a result, the image reading apparatus 1 according to the second embodiment can reduce the potential for the failure of the second image sensor 51 due to dust.

In the second embodiment, the glass member 60A includes the glass portion 61 and the glass holding frame 62 but is identical in shape with the glass member 60 of the first embodiment. Thus, the image reading apparatus 1 according to the second embodiment can use the covering member 63 (FIG. 8) instead of the glass member 60A and the fixing portion 65 and obtain the effects similar to those brought about by the first embodiment.

As described above, the image reading apparatus 1 according to the second embodiment includes the glass portion 61 having the length greater than the second dimension L in the main scanning direction at the position facing the second image sensor 51. Thus, the image reading apparatus 1 can read an image of a document conveyed in the first conveying path 31 by the second image reading device 50. The glass portion 61 and the glass holding frame 62 constitute a part of the first conveying path 31 and the glass member 60A has the length greater than the first dimension D. Thus, the image reading apparatus 1 according to the second embodiment can minimize the irregularities of the surface in the first conveying path 31, smoothly convey a document along the first conveying path 31, and reduce the potential of problems such as paper jam and ripping due to the irregularities.

The glass member 60A is detachably fixed to the main unit 21 outside of the first conveying path 31 by the fixing portion 65 as is the case with the first embodiment. Thus, the image reading apparatus 1 according to the second embodiment can reduce the potential of problems such as paper jam and ripping due to the existence of the fixing portion 65.

The glass portion 61 has the same thickness T as the contact glass 6. Thus, the image reading apparatus 1 according to the second embodiment can obtain uniform reading quality between the first image reading device 10 and the second image reading device 50. In the second embodiment, the second image sensor 51 is held in position in the space defined by the ribs 52A of the sensor holder 52 and the glass member 60A. As a result, the image reading apparatus 1 according to the second embodiment can reduce the potential for the failure of the second image sensor 51 due to dust. The image reading apparatus 1 according to the second embodiment can use the covering member 63 instead of the glass member 60A and the fixing portion 65. In other words, the image reading apparatus 1 can be applicable as an image reading apparatus including the first image reading device 10 only. Even when the covering member 63 is disposed, the fixing portion 64 is located outside of the first conveying path 31. Thus, the image reading apparatus 1 can minimize the irregularities of the surface in the first conveying path 31 and reduce the potential of problems such as ripping of a document due to the irregularities and contact with the fixing portion 64.

The illustrative embodiments show, but the disclosure is not limited to that the ribs 52A stand along all sidewalls of the sensor holder 52 so as to enclose the second image sensor 51 in all directions. The ribs 52A may be formed in any shape as long as the sensor holder 52 (around the second image sensor 51) can be kept away from dust.

The glass member 60, 60A may be located on an upstream side in the first conveying path 31 in the document conveying direction and may be chamfered on the sides and corners thereof facing the first conveying path 31.

Although an illustrative embodiment and examples of modifications of the present invention have been described in detail herein, the scope of the invention is not limited thereto. It will be appreciated by those skilled in the art that various modifications may be made without departing from the scope of the invention. Accordingly, the embodiment and examples of modifications disclosed herein are merely illustrative. It is to be understood that the scope of the invention is not to be so limited thereby, but is to be determined by the claims which follow.

What is claimed is:

1. An image reading apparatus comprising:
a document conveying mechanism configured to convey a first document in a document conveying direction;
a first image reading device configured to read an image of a first surface of the first document, conveyed in the document conveying direction, in a first reading range extending in a main scanning direction perpendicular to the document conveying direction; and
a second image reading device configured to read an image of a second surface of the first document, conveyed in the document conveying direction, in a second reading range extending in the main scanning direction, and
wherein the document conveying mechanism is configured to convey the first document from the second image reading device to the first image reading device, and
wherein the second reading range in which the second image reading device is configured to read the image of the second surface of the first document is different in the main scanning direction from the first reading range in which the first image reading device is configured to read the image of the first surface of the first document opposite to the second surface of the first document.

2. The image reading apparatus according to claim 1, wherein the document conveying mechanism is configured to convey the first document along a U-shaped path extending from the second image reading device to the first image reading device.

3. The image reading apparatus according to claim 1, further comprising a platen glass configured to receive a second document,
wherein the first image reading device is configured to move to read an image of the second document received by the platen glass.

4. The image reading apparatus according to claim 1, wherein the second reading range is smaller than the first reading range in the main scanning direction.

5. The image reading apparatus according to claim 4, further comprising:
a covering portion configured to cover the second image reading device and guide the first document, wherein the covering portion includes a glass portion having a dimension greater than the second reading range in the main scanning direction; and
a fixing portion disposed outside, in the main scanning direction, a range corresponding to the first reading range of the first image reading device and configured to fix the covering portion relative to the second image reading device,
wherein the glass portion is disposed facing the second image reading device within a range corresponding to the second reading range in the main scanning direction.

6. The image reading apparatus according to claim 5, wherein the dimension of the glass portion is greater than the first reading range in the main scanning direction,
wherein the fixing portion is disposed at a first end of the glass portion extending in the main scanning direction, and
wherein the first end of the glass portion and a second end of the glass portion opposite to the first end are disposed outside the range corresponding to the first reading range in the main scanning direction.

7. The image reading apparatus according to claim 5, wherein the covering portion includes a holding member holding the glass portion,
wherein the holding member has a dimension greater than the first reading range in the main scanning direction,
wherein the fixing portion is disposed at a first end of the holding member extending in the main scanning direction,
wherein the first end of the holding member and a second end of the holding member opposite to the first end are disposed outside the range corresponding to the first reading range in the main scanning direction, and
wherein the holding member is configured to guide the first document within the range corresponding to the first reading range in the main scanning direction.

8. The image reading apparatus according to claim 7, wherein the holding member is configured to guide the first document outside the range corresponding to the second reading range in the main scanning direction.

9. The image reading apparatus according to claim 5, further comprising a platen glass having a predetermined thickness and configured to receive a second document,
wherein the first image reading device is configured to move to read an image of the second document received by the platen glass, and
wherein the glass portion has the same thickness as the platen glass.

10. The image reading apparatus according to claim 1, wherein the second image reading device includes:
a contact image sensor;
a covering portion disposed facing the contact image sensor from above; and
a sensor holder having a shape of a box that is open toward the contact image sensor and configured to hold the contact image sensor in position below the covering portion,
wherein the sensor holder includes ribs extending to and contacting the covering portion such that the contact image sensor is enclosed by the sensor holder and the covering portion.

11. The image reading apparatus according to claim 5, wherein the second image reading device is replaceable with a covering member having a dimension greater than the first reading range in the main scanning direction.

12. The image reading apparatus according to claim 3, further comprising:
a main unit including the platen glass and the first image reading device; and
a cover unit pivotally attached to the main unit, the cover unit being configured to cover the platen glass and fix a position of the second document received by the platen glass, the cover unit including:
a document tray configured to receive the first document; and
the second image reading device.

* * * * *